US011954346B2

(12) United States Patent
Alkalay et al.

(10) Patent No.: US 11,954,346 B2
(45) Date of Patent: Apr. 9, 2024

(54) USING MULTI-STREAM STORAGE DEVICES IN LOG STRUCTURED STORAGE SYSTEM

(71) Applicant: EMC IP Holding Company LLC, Hopkinton, MA (US)

(72) Inventors: Amitai Alkalay, Kadima (IL); Lior Kamran, Rishon LeZion (IL); Steven Morley, Mendon, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 19 days.

(21) Appl. No.: 17/238,613

(22) Filed: Apr. 23, 2021

(65) Prior Publication Data
US 2022/0342542 A1    Oct. 27, 2022

(51) Int. Cl.
G06F 3/00 (2006.01)
G06F 3/06 (2006.01)
G06F 12/02 (2006.01)

(52) U.S. Cl.
CPC ............ G06F 3/064 (2013.01); G06F 3/0604 (2013.01); G06F 3/0652 (2013.01); G06F 3/0689 (2013.01); G06F 12/0253 (2013.01); G06F 2212/7205 (2013.01)

(58) Field of Classification Search
CPC ...... G06F 3/064; G06F 3/0604; G06F 3/0652; G06F 12/0253; G06F 2212/7205; G06F 3/0689
See application file for complete search history.

(56) References Cited

U.S. PATENT DOCUMENTS

| | | | | |
|---|---|---|---|---|
| 2002/0035666 A1* | 3/2002 | Beardsley | ........... | G06F 12/0804 711/E12.04 |
| 2017/0371781 A1* | 12/2017 | Choi | ..................... | G06F 3/0608 |
| 2019/0332540 A1* | 10/2019 | Kang | .................. | G06F 12/0873 |
| 2020/0334139 A1* | 10/2020 | Hwang | ................. | G06F 11/076 |
| 2021/0019255 A1* | 1/2021 | Akin | ................... | G06F 12/0253 |

* cited by examiner

Primary Examiner — Reginald G Bragdon
Assistant Examiner — Michael L Westbrook
(74) Attorney, Agent, or Firm — DALY, CROWLEY, MOFFORD & DURKEE, LLP

(57) ABSTRACT

A method is provided for use in a storage processor, the method comprising: receiving a write request, the write request including a request to store user data in an array that includes a plurality of solid-state drives (SSD); executing the write request by: identifying metadata that is associated with the write request, and writing the user data and the metadata to different data streams that are opened on the plurality of SSDs; wherein writing the user data and the metadata to different data streams causes: (i) the user data to be stored in one or more first erase units of any of the plurality of SSDs, and (ii) the metadata to be stored in one or more second erase units of any of the plurality of SSDs, such that no part of the metadata is stored on any of the one or more first erase units, and no part of the user data is stored on any of the one or more second erase units.

14 Claims, 11 Drawing Sheets

US 11,954,346 B2

USING MULTI-STREAM STORAGE DEVICES IN LOG STRUCTURED STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for use in a storage processor, the method comprising: receiving a write request, the write request including a request to store user data in an array that includes a plurality of solid-state drives (SSD); executing the write request by: identifying metadata that is associated with the write request, and writing the user data and the metadata to different data streams that are opened on the plurality of SSDs; wherein writing the user data and the metadata to different data streams causes: (i) the user data to be stored in one or more first erase units of any of the plurality of SSDs, and (ii) the metadata to be stored in one or more second erase units of any of the plurality of SSDs, such that no part of the metadata is stored on any of the one or more first erase units, and no part of the user data is stored on any of the one or more second erase units.

According to aspects of the disclosure, a storage system is provided, comprising: a memory; and at least one processor that is operatively coupled to the memory, the at least one processor being configured to perform the operations of: receiving a write request, the write request including a request to store user data in an array that includes a plurality of solid-state drives (SSD); executing the write request by: identifying metadata that is associated with the write request, and writing the user data and the metadata to different data streams that are opened on the plurality of SSDs; wherein writing the user data and the metadata to different data streams causes: (i) the user data to be stored in one or more first erase units of any of the plurality of SSDs, and (ii) the metadata to be stored in one or more second erase units of any of the plurality of SSDs, such that no part of the metadata is stored on any of the one or more first erase units, and no part of the user data is stored on any of the one or more second erase units.

A non-transitory computer-readable medium storing one or more processor-executable instructions, which, when executed by one or more processors of a storage system, cause the one or more processors to perform the operations of: receiving a write request, the write request including a request to store user data in an array that includes a plurality of solid-state drives (SSD); executing the write request by: identifying metadata that is associated with the write request, and writing the user data and the metadata to different data streams that are opened on the plurality of SSDs; wherein writing the user data and the metadata to different data streams causes: (i) the user data to be stored in one or more first erase units of any of the plurality of SSDs, and (ii) the metadata to be stored in one or more second erase units of any of the plurality of SSDs, such that no part of the metadata is stored on any of the one or more first erase units, and no part of the user data is stored on any of the one or more second erase units.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
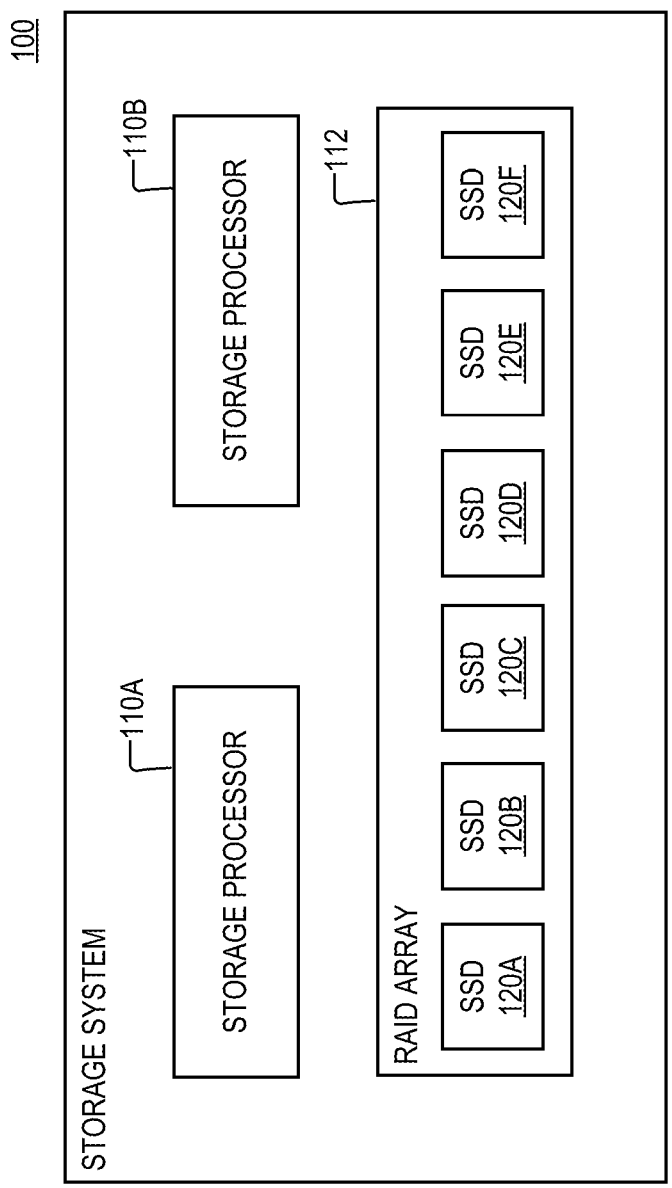
FIG. 1 is a diagram of an example of a storage system, according to aspects of the disclosure.

FIG. 1 is a diagram of an example of a storage system 100, according to aspects of the disclosure. As illustrated, the storage system 100 may include a storage processor 110A, a storage processor 110B, and a Redundant Array of Independent Disks (RAID) 112. The storage processor 110A may include any suitable type of computing device that is configured to receive IO requests and retrieve or store data in the RAID array 112 in response to the IO requests. The storage processor 110B may include any suitable type of computing device that is configured to receive IO requests and retrieve or store data in the RAID array 112 in response to the IO requests. The RAID array 112, as illustrated, may include solid-state drives (SSDs) 120A-F. According to the present example, the RAID array 112 is configured to operate in a RAID 6 configuration, such that SSDs 120A-D are configured to store user data, and storage devices 102E-F are configured to store parity data. Although in the example of FIG. 1 the RAID array 112 includes SSDs, it will be understood that alternative implementations are possible in which nvRAM devices are used instead. Stated succinctly, the ideas disclosed throughout the disclosure are not limited to SSDs, and can be applied to any suitable type of solid-state storage device. Furthermore, although array 112 is a RAID array, it will be understood that alternative implementations are possible in which another type of storage array is used, such as JBOD or MAID. Stated succinctly the present disclosure is not limited to any specific storage array architecture.

Figure 2:
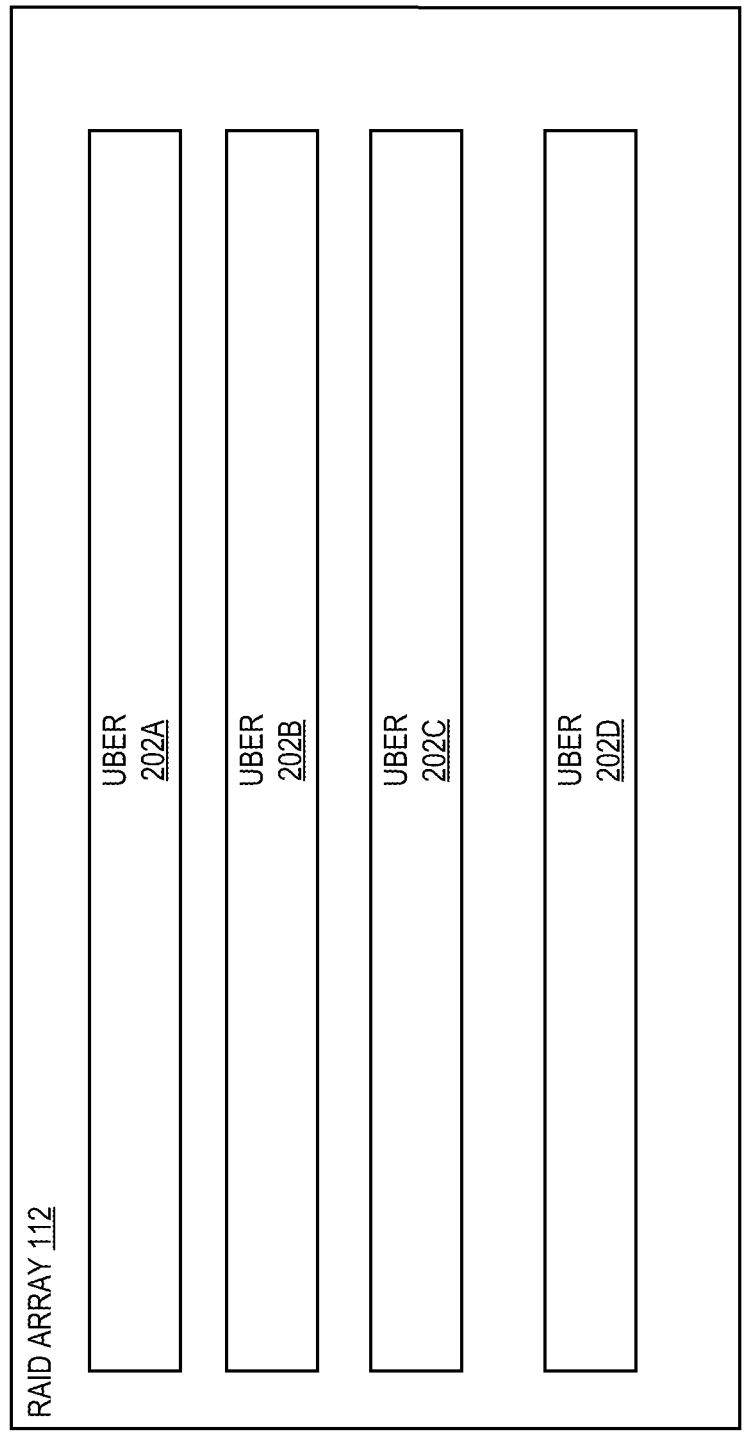
FIG. 2 is a diagram of an example of an array unit, according to aspects of the disclosure.

FIG. 2 is a diagram, illustrating one aspect of the logical organization of the RAID array 112. As illustrated, the RAID array 112 may be divided into ubers 202A-D. According to the present example, each of ubers 202A-D includes storage space on all of SSDs 120A-F. However, it is possible for one of the ubers 202A-D to include storage space on fewer than all of SSDs 120A-F. For example, in one possible implementation, uber 202A may include storage space on SSDs 120A-B and 120D-F only, and uber 202B may include storage space on SSDs 120A and 120C-F only. In other words, in some implementations, different ubers 202 may span different SSDs 120. According to the present example, each of the ubers 202A-D is 64 GB in size, however, the present disclosure is not limited to any specific size for the ubers 202A-D. Although in the example of FIG. 2, the RAID array 112 includes 4 ubers, it will be understood that the RAID array 112 may include any number of ubers (e.g., 1, 2, 5, 25, 125, etc.)

Figure 3:
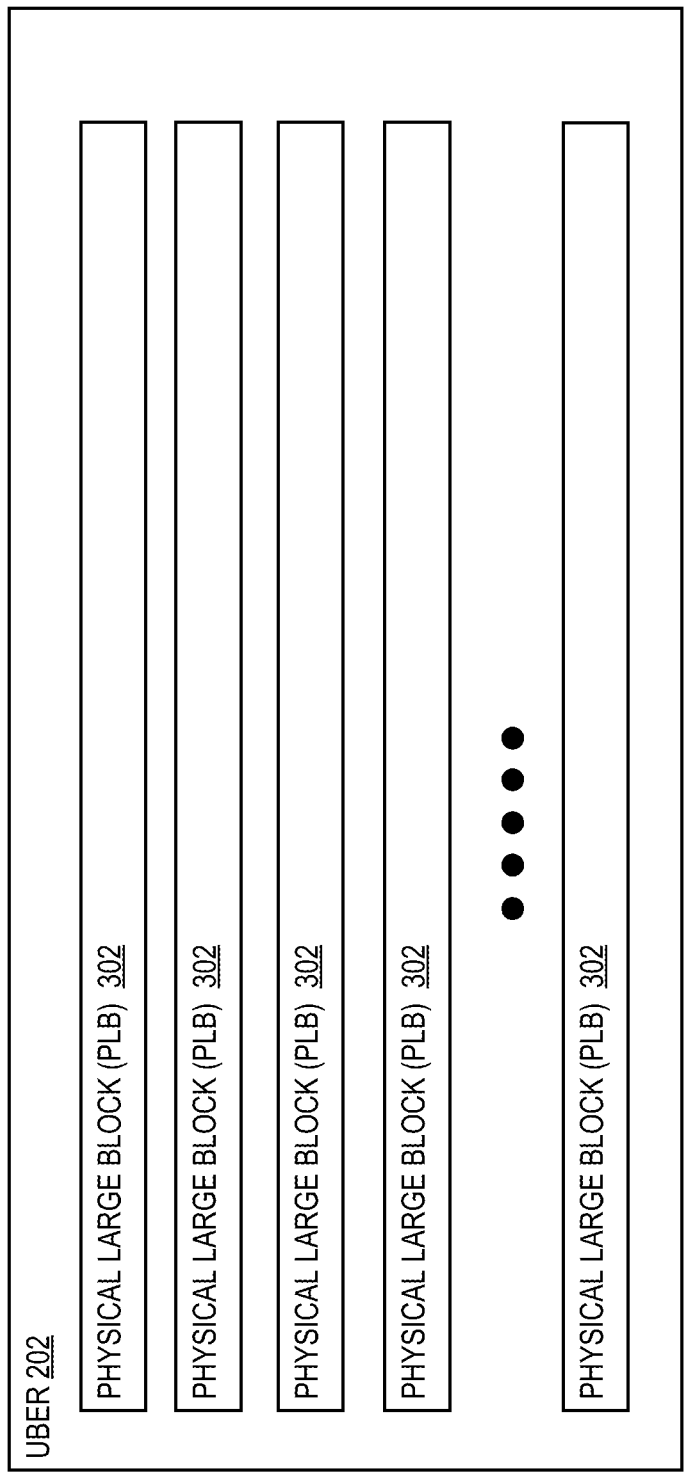
FIG. 3 is a diagram of an example of a data storage unit, according to aspects of the disclosure.

FIG. 3 is a schematic diagram of an example of an uber 202, according to aspects of the disclosure. As the numbering suggests, the uber 202 may be the same or similar to any of the ubers 202A-D. The uber 202 may include a plurality of lines, which are herein referred to as physical large blocks (PLBs) 302. Each of the PLBs 302 may include a portion of SSD 120A, a portion of SSD 120B, a portion of SSD 120C, a portion of SSD 120D, a portion of SSD 120E, and a portion of SSD 120F. Although in the present example each of the PLBs 302 includes a portion of each of SSDs 120A-F, it will be understood that in some implementations, any of the PLBs may include a portion of fewer than all of SSDs 120A-F. According to the present example, each of the PLBs is 3 MB in size. However, it will be understood that the present disclosure is not limited to any specific size for the PLBs 302.

Figure 4:
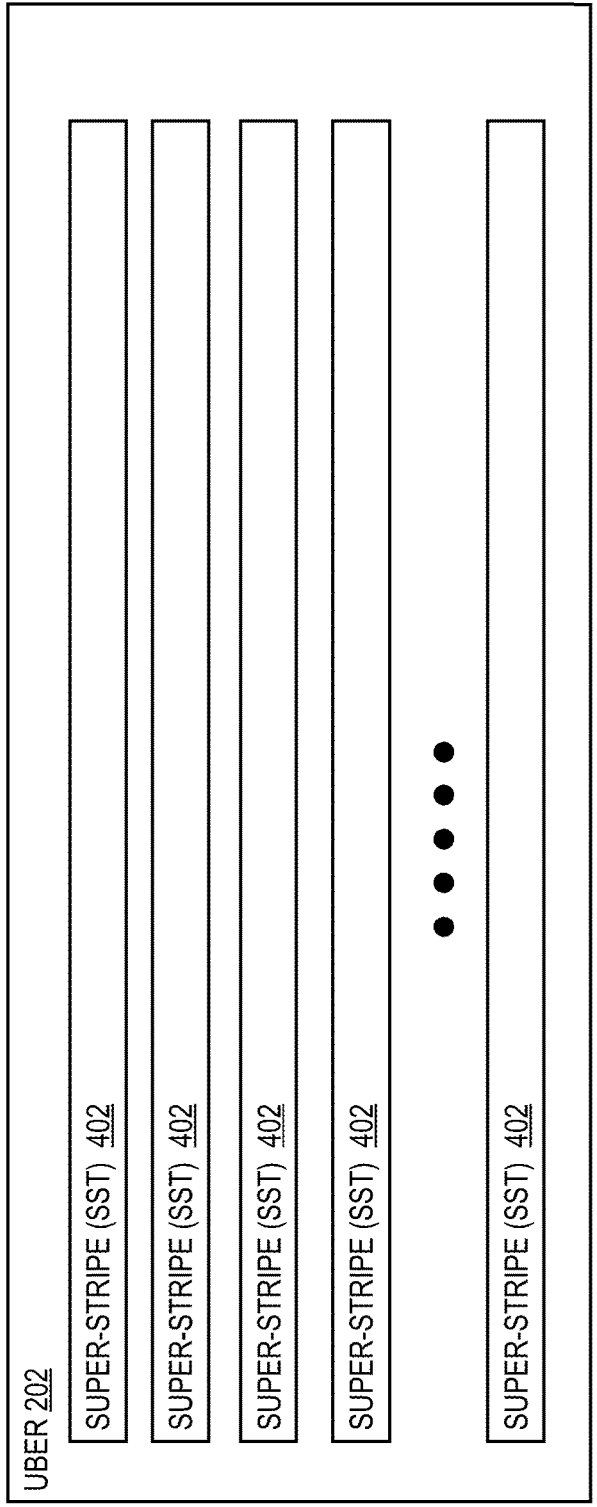
FIG. 4 is a diagram of an example of a data storage unit, according to aspects of the disclosure.
Figure 5A:
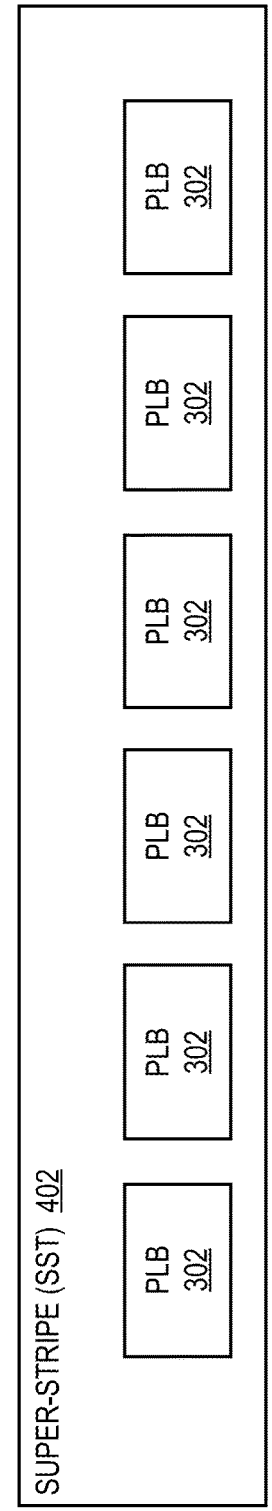
FIG. 5A is a diagram of an example of a super-stripe, according to aspects of the disclosure.

FIGS. 4 and 5A show another aspect of the logical organization of the uber 202 (shown in FIG. 3). As illustrated, the uber 202 may also be divided into super-stripes 402. As is discussed further below, each of the super-stripes 402 includes a unit of storage space that is processed by a garbage collector 711 (shown in FIG. 7). According to the present example, each of the super-stripes 402 includes six (6) PLBs 302. However, it will be understood that the present disclosure is not limited to the super-stripes 402 including any specific number of PLBs 302.

Figure 5B:
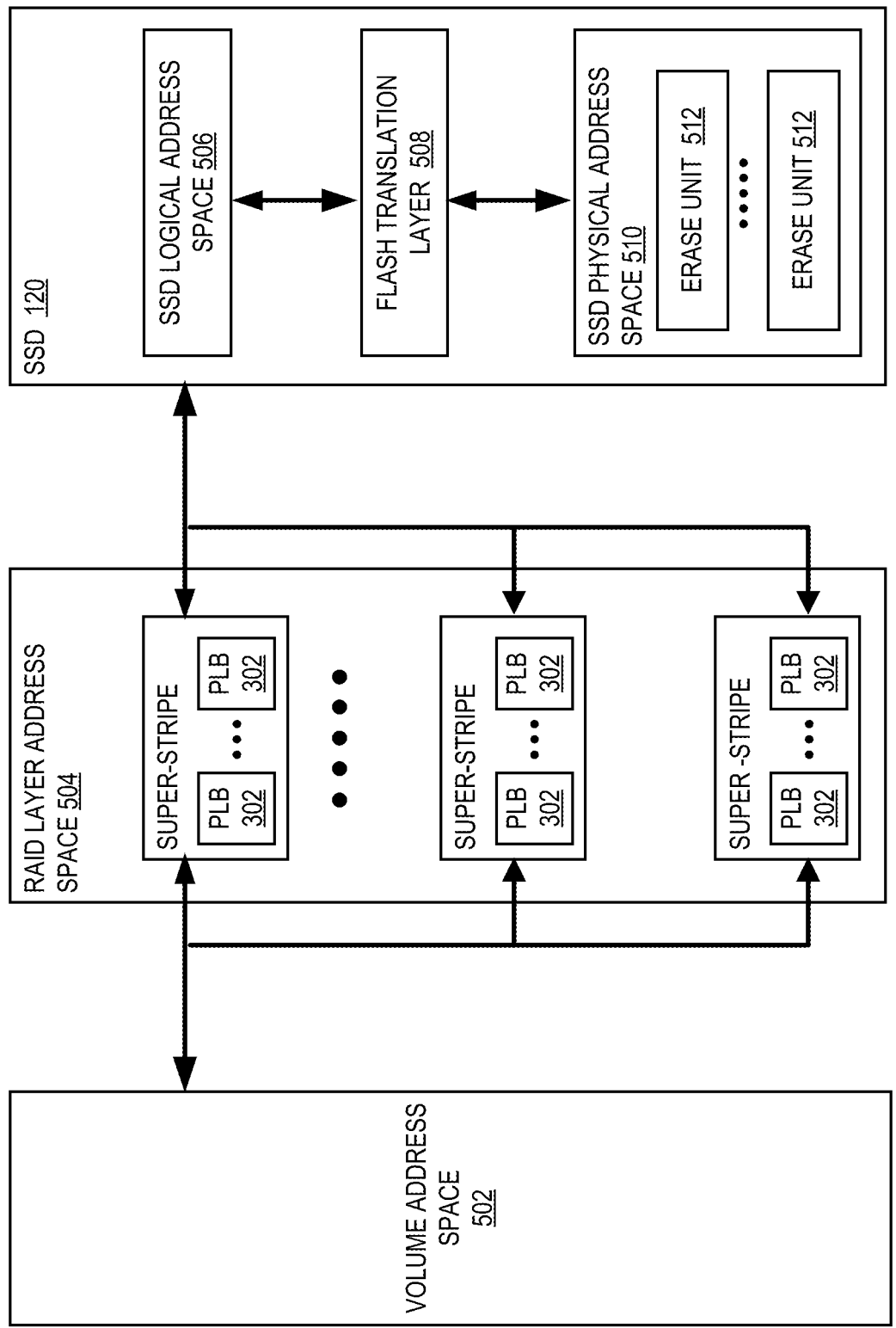
FIG. 5B is a diagram illustrating the mapping between different address spaces in the storage system of FIG. 1, according to aspects of the disclosure.

FIG. 5B is a schematic diagram illustrating the mapping between different address spaces in the storage system 100. Shown in FIG. 5 is a volume address space 502, a RAID layer address space 504, an SSD logical address space 506, and an SSD physical address space 510. The volume address space may include a plurality of logical block addresses in a volume of a file system 712 (shown in FIG. 7). The RAID layer address space 504 may be the address space of the RAID array 112, which is managed by the RAID layer 715 (shown in FIG. 7). The RAID layer address space 504 may include a plurality of PLBs 302 (which may be organized in super-stripes 402). The address space 506 may be a logical address space of an SSD 120, and it may include a plurality of logical addresses that are exposed by the SSD to the outside world. The physical address space 510 may be a physical address space of the SSD 120, and it may include a plurality of erase units 512. An erase unit, as used through the disclosure, may include a plurality of memory cells (e.g., NAND cells), which are required to be erased together by the architecture of the SSD 120. The SSD 120 may be the same or similar to any of the SSDs 120A-F. In this regard, it will be understood that each of the SSDs 120A-F may include a respective logical address space 506, a respective physical address space 510, and a respective flash translation layer 508.

FIG. 5B illustrates that PLBs 302 in the storage array 112 are mapped to a respective logical address in the volume address space 502. FIG. 5B further illustrates that PLBs 302 in the storage array 112 are mapped to erase units 512 in the SSD physical address space 510. The mapping may be performed by the RAID layer 715 (shown in FIG. 7) and the flash translation layer 508.

The logical address space 506 may be mapped to the physical address space 510 by a flash translation layer 508. As is well known in the art, the mapping between addresses in the logical address space 506 and erase units 512 (or specific physical addresses) in the physical address space 510 may repeatedly change during the operation of the SSD 120. As noted above, each of the erase units 512 (in the physical address space 510) may include a set of memory cells (e.g., NAND memory cells) that are deleted together. Unlike hard disk drives (HDDs), NAND SSD drives cannot overwrite existing data—they must first erase the old data before writing the new data. When a delete instruction for a particular address in the volume address space 502 is received, the delete instruction may pertain to data that is stored in only a portion of an erase unit 512. In response to the delete instruction, a garbage collector may have to move the remainder of the data stored in the erase unit (which is not desired to be deleted) to another erase unit. After the data is moved, the entire erased unit can be deleted. In a storage system that handles a large volume of reads and writes, the internal data movements that are performed by internal garbage collectors of SSDs can add a significant overhead.

Some SSDs support a command that allows entire erase units to be marked as unused. The command may accept a range of addresses in the logical address space (e.g., SSD logical address space 506) of an SSD (e.g., SSD 120) as an input parameter, which can be subsequently mapped to one or more entire erase units by the flash translation layer of the SSD (e.g., flash translation layer 508). Afterwards, the one or more erase units can be marked as unused, thus removing the need for a garbage collector (e.g., the internal garbage collector of the SSD) to move any of the data stored in them. Because this command deletes entire erase units in an SSD, the application of this command reduces (or ideally removes) the need for SSD to execute its internal garbage collector. Depending on the type of protocol that is used to communicate with the SSD, the delete command may include an UNMAP command (SCSI), a TRIM command (ATA), or a DEALLOCATE command (NVMe). Throughout the remainder of the disclosure, the command will be generically referred to as an UNMAP command. However, it will be understood that the use of the term "UNMAP" does not presume the use of any specific protocol for interacting with the SSDs 120 of the RAID array 112. Furthermore, it should be noted that in some instances one or more erase units in an SSD may overlap only partially with the range of addresses that is provided in an UNMAP command. In such instances, logical addresses that fall into partially-overlapped erase units may be deleted by marking individual SSD physical addresses as unused (instead of marking an entire erase unit as unused).

The disclosure that follows describes a technique that utilizes the organization of PLBs into super-stripes in combination with the UNMAP command to decrease (or ideally eliminate) the overhead that is introduced by the execution of the internal garbage collectors of the SSDs 120A-F of the RAID array 112. An advantage of this technique is that it increases the availability of the RAID array 112, as well as the response time of the storage system 100.

Figure 6:
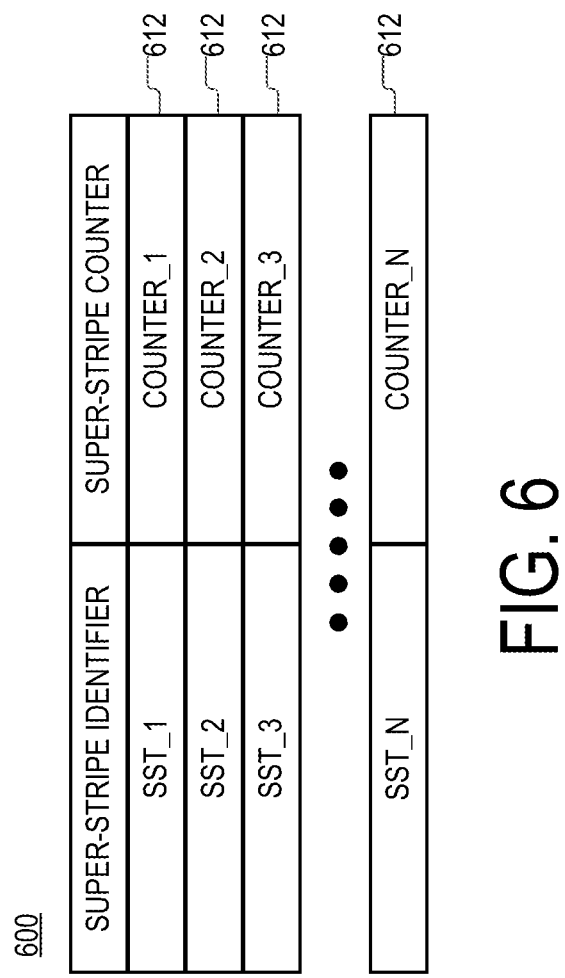
FIG. 6 is a diagram of an example of super-stripe management structure, according to aspects of the disclosure.

FIG. 6 is a diagram of an example of a super-stripe management structure 600. As illustrated, the super-stripe management structure 600 may include a plurality of entries 612. Each of the entries 612 may map an identifier for a different super-stripe in the RAID array 112 to a super-stripe counter for that super-stripe. The term "super-stripe counter" shall refer to any variable and/or synchronization object that indicates whether a super-stripe is physically full. A super-stripe is physically full when all PLBs in the super-stripe have been written to (i.e., when data all of the PLBs have been filled with data). By contrast, a super-stripe may be logically full when all PLBs have been allocated to corresponding clients. The term client, as used herein, refers to a thread, process, and/or software module that is configured to write data to a PLB. Because a time period may pass between the instant at which a PLB is allocated and an instant in which the PLB is written to, a super-stripe that is logically fill may not be physically full. This distinction matters for the operation of the garbage collector 711 (shown in FIG. 7). If the garbage collector 711 were to begin processing a super-stripe before all scheduled (or otherwise intended) writes to the super-stripe have completed, the integrity of the data that is stored in the RAID array 112 may be compromised. The use of super-tripe counters is discussed further below with respect to FIGS. 9-10.

Figure 7:
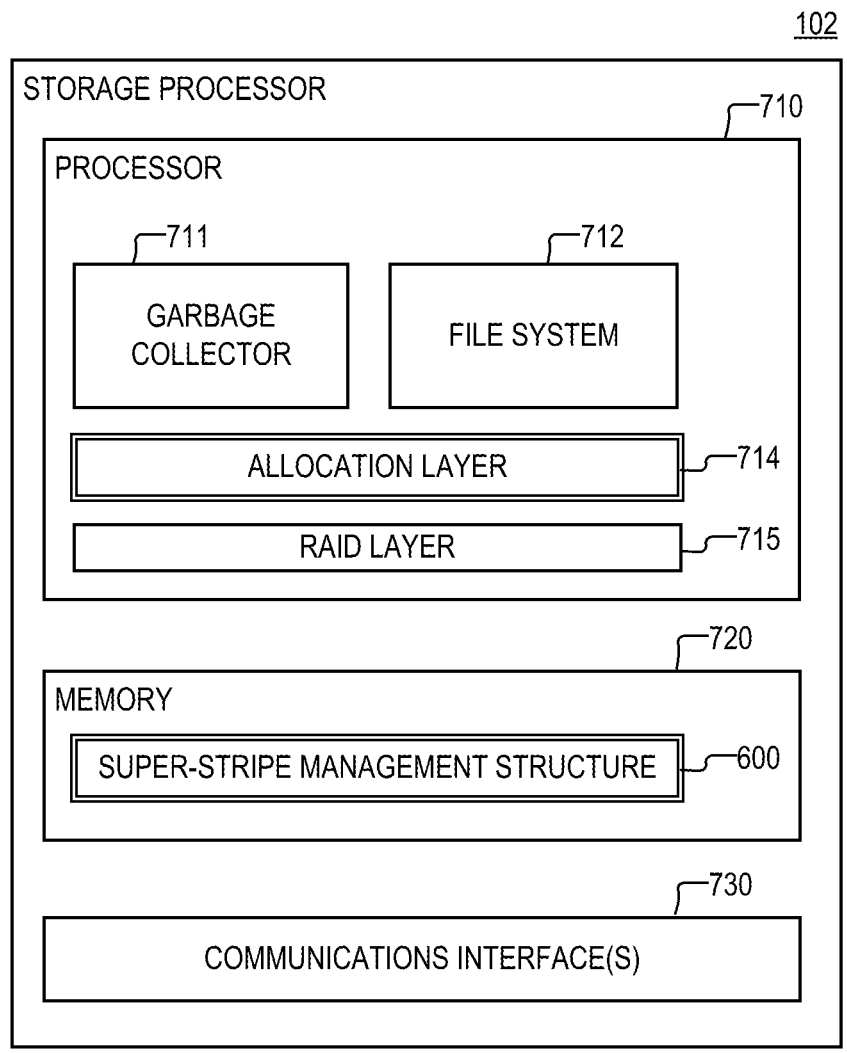
FIG. 7 is a diagram of an example of a storage server, according to aspects of the disclosure.

FIG. 7 is a diagram of an example of a storage processor 110, according to aspects of the disclosure. As illustrated, the storage processor 110 may include a processor 710, a memory 720, and a communications interface 730. The processor 710 may include any suitable type of processing circuitry. For example, in some implementations, the processor 710 may include one or more of a general-purpose processor (e.g., an x86 processor, a RISC processor, etc.), an application-specific integrated circuit (ASIC), a field-programmable gate array (FPGA), and/or any other suitable type of processing circuitry. The memory 720 may include any suitable type of volatile or non-volatile memory. For example, in some implementations, the memory 720 may include a random-access memory (RAM), a flash memory, a solid-state drive (SSD), a hard disk (HD), and/or any other suitable type of memory. As illustrated, the memory 720 may be configured to store the super-stripe management structure 600. The communications interface(s) 730 may include one or more of a Bluetooth interface, an Ethernet interface, an InfiniBand interface, a Wi-Fi interface, and/or any other suitable type of interface.

The processor 730 may be configured to execute a garbage collector 711, a file system 712, an allocation layer 714, and a RAID layer 715. The garbage collector 711 may include one or more processor-executable instructions that are configured to reclaim storage space (e.g., reclaim deleted PLBs). In some implementations, the garbage collector 711 may be configured to perform a process 1000, which is discussed further below with respect to FIG. 10. The file system 712 may be associated with a particular volume (and/or logical unit) in the storage system 100, and it may implement a data store for saving, retrieving, and updating files. The allocation layer 714 may include one or more processor-executable instructions that are configured to allocate PLBs. In some implementations, the allocation layer may be configured to execute a process 900, which is discussed further below with respect to FIG. 9. The RAID layer 715 may include a component of the storage processor 110 that handles read or write requests (from the file system 712) and interacts with the RAID array 112 to fulfill the requests.

As the numbering suggests, the storage processor 110 may be the same or similar to each of the storage processors 110A and 110B. In this regard, each of the storage processors 110A and 110B may be configured to execute a garbage collector 711, a file system 712, an allocation layer 714, and a RAID layer 715. Moreover, each of the storage processors 110A and 110B may store a copy of the super-stripe management structure 600.

Figure 8A:
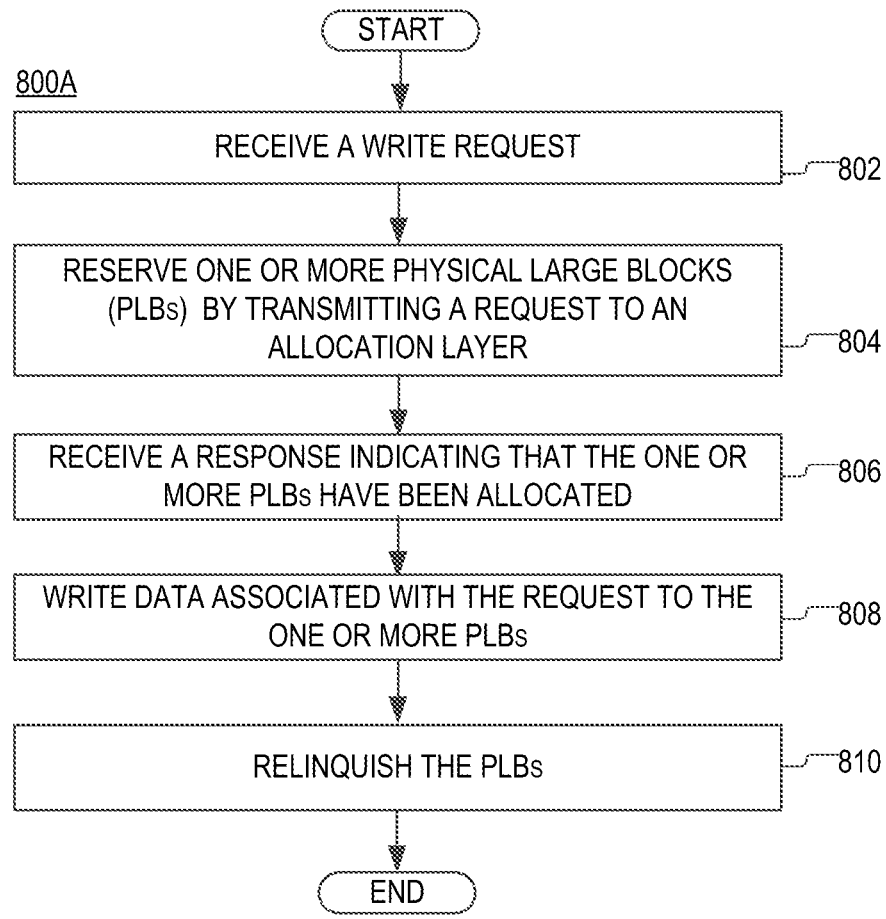
FIG. 8A is a flowchart of an example of a process, according to aspects of the disclosure.

FIG. 8A is a flowchart of an example of a process 800A, according to aspects of the disclosure. According to the present example, the process 800A is performed by a client that is executing on a storage processor 110 (e.g., one of the storage processors 110A or 110B). The client may include any thread, process, and/or software module that is configured to write data to a PLB. For example, and without limitation, the process 800A may be performed by one or more garbage collection threads and/or one or more threads that are configured to write user data to the raid array 112.

At step 802, a write request is received. In some implementations, the write request may include a request that is generated by the file system 712. However, alternative implementations are possible in which the write request is generated by an internal device and/or another component of the storage processor 110. At step 804, a request is transmitted to the allocation layer 714 to reserve one or more PLBs. At step 806, a response is received (e.g., from the allocation layer) indicating that one or more PLBs have been reserved. At step 808, data associated with the write request is written to the allocated PLBs. In some implementations, to store data in any of the allocated PLBs, the thread executing the process 800A may cause (directly or indirectly) the RAID layer 715 to execute the process 800B (shown in FIG. 8B). By way of example, the thread executing the process 800A may transmit to the RAID layer 715 an instruction to store the data in the PLB. Such instruction may also be referred to as a "write request", but it should be distinguished from the write request that is received by the thread executing the process 800A (at step 802). At step 810, the one or more PLBs are relinquished. In some implementations, relinquishing the one or more PLBs may include transmitting, to the allocation layer 714 an indication that the PLBs are being relinquished.

As discussed above, the storage system 100 maintains a super-stripe management structure 600 that maps the super-stripes 402 in the RAID array 112 to associated super-stripe counters. Each of the super-stripe counters indicates whether the counter's respective super-stripe is physically full. When a PLB becomes full with data, the super-stripe counter, for the super-stripe, which the PLB is part of, is incremented by one. Furthermore, in some implementations, relinquishing the PLB may include: for each PLB, incrementing a super-stripe counter that is associated with the super-stripe, which the PLB is part of (provided that the PLB has become full). For example, the client may provide a new value for the counter (e.g., an incremented value) to the allocation layer 714, and the allocation layer 714 may store the new value in the super-stripe management structure 600. As another example, the allocation layer 714 may increment the super-stripe counter automatically, upon detecting that the PLB has become full.

Figure 8B:
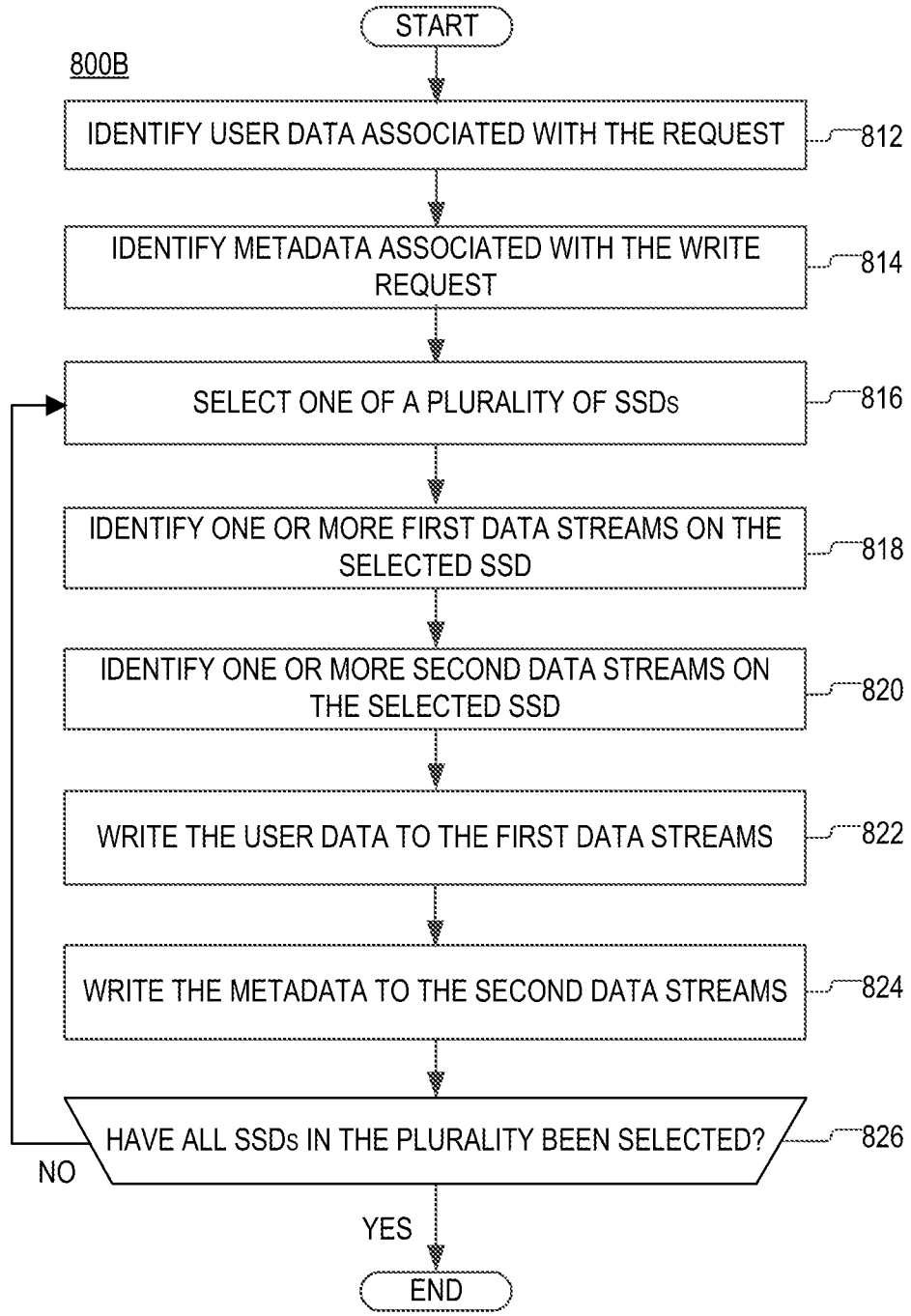
FIG. 8B is a flowchart of an example of a process, according to aspects of the disclosure.

FIG. 8B is a flowchart of an example of a process 800B, according to aspects of the disclosure. According to the present example, the process 800B is performed by the RAID layer 715 of the storage processor 110 (e.g., any of storage processors 110A and 110B). However, alternative implementations are possible in which the process 800B is performed, at least partially, by another component of the storage processor 110. It will be understood that the process 800B is not limited to being performed by any specific component of the storage processor 110 and/or storage system 100. At step 812, user data associated with the write request (received at step 802) is identified. The user data may include data that is desired to be stored and subsequently retrieved from the RAID array 112. By way of example, in some implementations, the write request may include an instruction to store data in the RAID array 112, which is transmitted at step 808 of the process 800A (shown in FIG. 8A).

At step 814, metadata associated with the write request is identified. The metadata may include any data that is used for the purposes of storing and retrieving the user data. The metadata may include a hash digest of the user data, as well one or more mappings between addresses in different logical or physical address spaces where the data is stored.

At step 816, one of the SSDs 120A-D is selected, which has not been selected during a previous iteration of steps 816-826.

At step 818, one or more first data streams are identified that are associated with the selected SSD. Identifying the one or more data streams may include opening the one or more first data streams on the selected SSD. Alternatively, identifying the one or more first data streams may include retrieving identifiers corresponding to the one or more first data streams (e.g., from a pool of stream identifiers).

At step 820, one or more second data streams are identified that are associated with the selected SSD. Identifying the one or more second data streams may include opening the second data stream on the selected SSD. Alternatively, identifying the one or more second data streams may include retrieving identifiers corresponding to the one or more second data streams (e.g., from a pool of stream identifiers).

At step 822, a portion of the user data is written to the one or more first data streams. Writing the user data to the one or more first data streams causes the user data to be stored in one or more first erase units of the selected SSD.

At step 824, a portion of the metadata is written to the one or more second data streams. Writing the metadata to the one or more second data streams causes the metadata to be stored in one or more second erase units of the selected SSD. Each of the second erase units may be different from any of the first erase units. In this regard, using different data streams to write the user data and the metadata causes the user data and the metadata to be stored in erase units of the selected SSD that are separate from one another.

At step 826, a determination is made if each of SSDs 120A-D has already been selected once at step 818. If all of the SSDs 120A-D have been selected already, the process 800B ends. Otherwise, if not all of the SSDs 120A-D have been selected, the process 800B returns to step 818, and another one of the SSDs is selected.

In some implementations, the storage system 100 may: (i) write user data by using log-structured writes, and (ii) write metadata by using in-place writes. When log-structured writes are used to write user data, the storage system 100 may write the user data in full PLBs. It will be recalled that that each PLB may be 3 MB in size. By contrast, when metadata is written by using in-place writes, the storage system 100 may write the user data in blocks that are 4 KB in size. If user data and metadata were stored on the same erase unit of an SSD, it will be difficult to delete the user data without creating work for the SSD's internal garbage collector—to move metadata that is mixed with the user data. However, because the storage system 100 uses different data streams to write user data and metadata, no portion of the user data is written to the same erase unit as any of the metadata. This, in turn, allows the storage system 100 to delete user data, without causing internal data movements (by an SSD's internal garbage collector) in any of the SSDs 120A-D.

Although in the example of FIG. 8B the user data written at step 822 includes only user data that is associated with the write request (received at step 802), it will be understood that in some implementations the user data may include user data associated with multiple write requests. Although in the example of FIG. 8B, the metadata written at step 824 includes only metadata that is associated with the write request (received at step 802), it will be understood that in some implementations the metadata may include metadata associated with multiple write requests.

In some implementations, the process 800B may be used to write data to any of the PLBs 302 (shown in FIGS. 3 and 5A). According to one example, each PLB 302 may include 2 MB of user data (e.g., compressed user data) and 1 MB of parity data. The user data of a PLB may be written to four of SSDs 120A-F and the parity data for the PLB may be written to the remaining two of the SSDs 120A-F. A write request to any of SSDs 120A-F may include: (i) the data to write, (ii) an address in a logical address space, such as the logical address space 506 (shown in FIG. 506), and (iii) a stream ID. The stream ID may serve as a hint to the SSD (and the flash translation layer of the SSD, in particular) to store all data that is associated with the stream ID in the same erase blocks.

Figure 9:
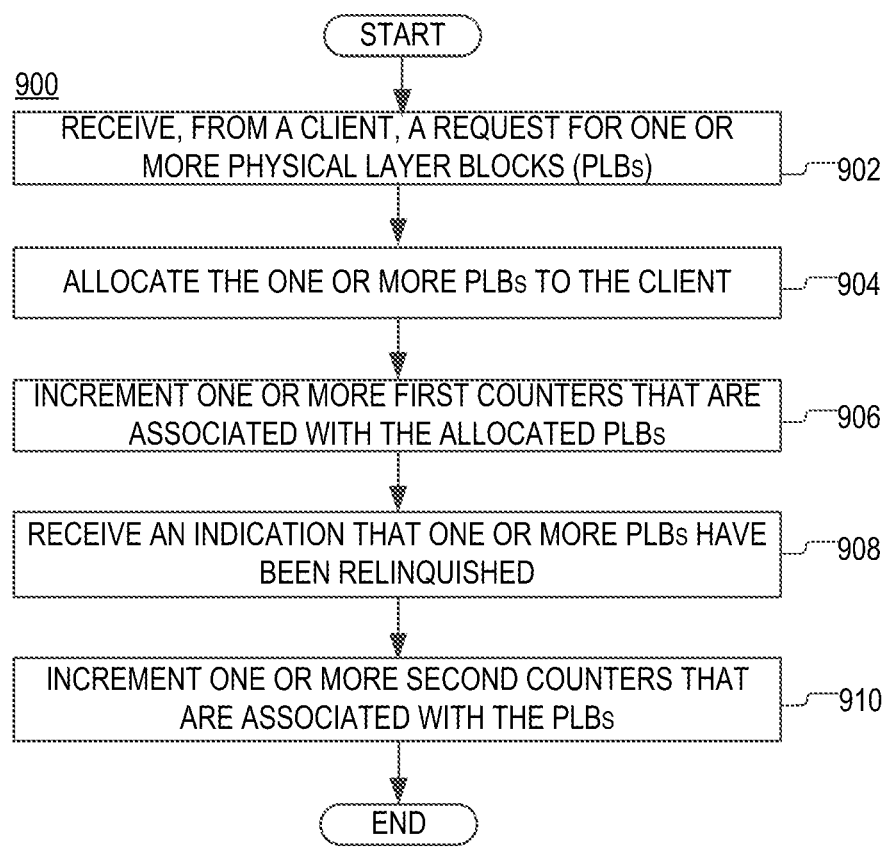
FIG. 9 is a flowchart of an example of a process, according to aspects of the disclosure.

FIG. 9 is a diagram of an example of a process 900, according to aspects of the disclosure. At step 902, the allocation layer 714 receives, from a client, a request for one or more PLBs. At step 904, the allocation layer 714 allocates one or more PLBs to the client in response to the request. Allocating the one or more PLBs may include providing identifier(s) of the PLBs to the client (from which the request is received at step 902) and/or placing a lock on the one or more PLBs to prevent them from being allocated to another client. At step 906, the allocation layer 714 increments one or more first counters that are associated with the one or more PLBs. Specifically, for each of the PLBs, the allocation layer 714 may increment a first counter that indicates whether the super-stripe, which the PLB is part of, is logically-full. As noted above, a super-stripe may be logically-full when all of its PLBs have been allocated (to be written to), but the writes may or may not have completed yet. At step 908, the allocation layer 714 receives an indication, from the client, that the one or more PLBs are relinquished. At step 910, the allocation layer 714 increments one or more second counters that are associated with the one or more PLBs. According to the present example, each of the second counters includes a super-stripe counter. Incrementing the one or more second counters may include: for each PLB that has been written to and completely filled with data as a result (such that no more free space remains in the PLB), incrementing a super-stripe counter that is mapped to the supers-stripe which the PLB is part of. As noted above, in some implementations, the client may provide new values for the counters of any super-stripes, which the one or more PLBs are part of. The provided value may then be written to the super-stripe management structure 600 (shown in FIG. 6). According to the example of FIG. 9, all PLBs that are allocated at step 904 are part of the same super-stripe. However, alternative implementations are possible in which at least two of the PLBs are part of different stripes.

In operation, the allocation layer 714, may allocate PLBs only from super-stripes that have been designated as active by the storage system 100. When a super-stripe becomes full, that super-stripe may be demoted to inactive status, and another inactive super-stripe may be promoted to active status. In some implementations, the storage system 100 may allow more than one active super-stripe. In some implementations, the maximum number of active super-stripes that can be present in the storage system 100 can be calculated in accordance with Equation 1 below:

$$S_m = \frac{(N_{drives} \times N_{stripes})}{N\_raid\_drives} \quad (1)$$

where $S_m$ is the maximum number of super-stripes, $N_{drives}$ is the number of SSDs in the RAID array 112, and $N_{raid\_drives}$ is the number of drives in an uber of the RAID array 112. In some implementations, the storage system 100 may use the maximum number of active super-stripes that is permitted by Equation 1 above. However, if the storage system 100 is under a heavy load, the storage system 100 may use fewer than the maximum number of active super-stripes in order to permit the garbage collector to prepare empty super-stripes at a rate that matches the rate at which PLBs (and/or superstripes) are written to.

In some implementations, the allocation layer 714 may be configured to allocate one super-stripe per processor of the storage server 102. When a super-stripe is assigned to a processing core, only PLBs that are part of the super-stripe may be allocated to clients that are executed by the core. Alternatively, in some implementations, the allocation layer 714 may be configured to allocate the same super-stripe to multiple processing cores.

Additionally or alternatively, in some implementations, the allocation layer 714 may be configured to allocate one super-stripe per client. By way of example, in some implementations, when a super-stripe is assigned to a client, only the client may be allowed to write data to the super-stripe (until the super-stripe is full). Having only one client write to a super-stripe in the storage system 100 is advantageous because it may simplify the performance of garbage collection on the super-stripe. In some implementations, when a PLB is allocated to the client, the client my use the same stream ID to write to the PLB. Additionally or alternatively, in some implementations, the client may use only one stream ID to write to the PLB. In general, data written by the same client may have a better chance to be deleted together. So, storing data that is written by the same client with the same stream ID makes it more likely for the data to be stored in the same erase blocks, which in turn makes it more likely to mark (at once) entire erase blocks as unused, when the data is deleted with an UNMAP command. As noted above, marking an entire erase block in an SSD as unused is advantageous because it allows the erase block to be deleted without the SSD performing garbage collection on the erase block beforehand.

In some implementations, the allocation layer 714 may allocate (at step 904) fewer PLBs than requested. In such a case, the client may submit a second request for additional PLBs, and the allocation layer 714 may allocate the remaining PLBs in response to the second request. In some implementations, the initial PLBs and the remaining PLBs may be part of different super-stripes.

Figure 10:
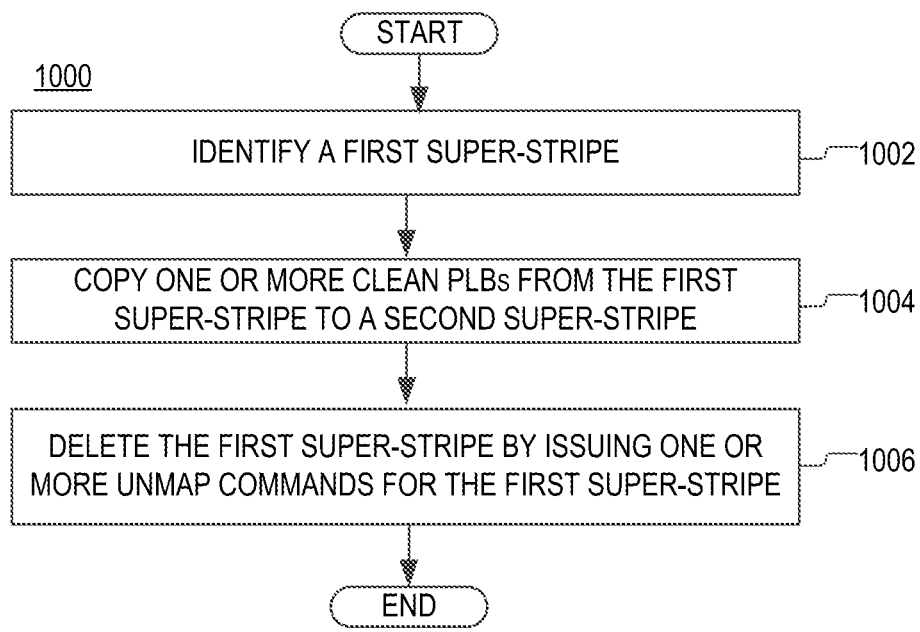
FIG. 10 is a flowchart of an example of a process, according to aspects of the disclosure.

FIG. 10 is a diagram of an example of a process 1000, according to aspects of the disclosure. At step 1002, the garbage collector 711 identifies a first super-stripe that satisfies a predetermined condition. The identified stripe may include: (i) one or more PLBs that have been marked for deletion, and/or (ii) one or more PLBs that have not been marked for deletion (hereinafter "clean PLBs"). At step 1004, the garbage collector 711 copies any clean PLBs that are present in the first super-stripe to a second super-stripe. At step 1006, the first-super-stripe is deleted by issuing one or more UNMAP commands. Any of the one or more UNMAP commands will cause the erase-units, in any of the SSDs 120A-D, that store at least one of the PLBs in the first super-stripe to be marked as unused. Conventionally, when an erase-unit in an SSD is marked as unused, that erase unit will be deleted, without the SSD running its internal garbage collector on the erase unit. In other words, deleting the first-stripe using one or more UNMAP commands is advantageous because it does away with (or at least reduces) the need for the SSDs in the RAID array 112 to run an internal garbage collector, before they can complete the deletion process on their end.

In some implementations, the first super-stripe may satisfy the predetermined condition (at step 1002) when its super-stripe counter is equal to a predetermined value. Additionally or alternatively, the condition may be satisfied when all PLBs in the super-stripe have been written to and/or when there are no allocated PLBs, which have not been written to yet. In one particular example, the super-stripe may satisfy the predetermined condition when it is physically full. In some implementations, when a super-stripe is physically full, the super-stripe counter for the super-stripe may be equal to the number of PLBs in the super-stripe.

FIGS. 1-10 are provided as an example only. At least some of the steps discussed with respect to FIGS. 1-10 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply.

Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage processor, the method comprising:

receiving, by the storage processor, a write request, the write request including a request to store user data in a storage array that includes a plurality of solid-state drives (SSDs), the storage array the storage processor being part of a storage system;

reserving, by using an allocation layer that is executed by the storage processor, one or more physical logical blocks (PLBs), each of the reserved PLBs being part of a respective one of a plurality of stripes;

executing the write request by: identifying metadata that is associated with the write request, and writing, by the storage processor, the user data and the metadata to different data streams that are opened on the plurality of SSDs, wherein writing the user data and the metadata to different data streams causes: (i) the user data to be stored in one or more first erase units that are part of any of the plurality of SSDs, and (ii) the metadata to be stored in one or more second erase units that are part of any of the plurality of SSDs, such that no part of the metadata is stored on any of the first erase units, and no part of the user data is stored on any of the second erase units, the first and second erase units being part of a plurality of erase units that are mapped to the reserved PLBs;

wherein the storage array is a Redundant Array of Independent Disks (RAID) array, wherein the allocation layer is configured to allocate only PLBs that are part of active stripes, and wherein a maximum number of stripes that are present in the in the storage system at any given time is determined in accordance with the equation of:

$$S_m = (N_{drives} \times N_{stripes}) / N\_raid\_drives$$

wherein $S_m$ is the maximum number of stripes, $N_{drives}$ is a count of SSDs in the RAID array, and N_raid_drives is a count of drives in an uber of RAID array.

2. The method of claim 1, further comprising performing, by the storage processor, garbage collection on the storage array, wherein performing the garbage collection includes: identifying any given one of the plurality of stripes that includes PLBs marked for deletion, copying any clean PLBs that are part of the given stripe to a different stripe, and deleting the given stripe.

3. The method of claim 1 further comprising relinquishing each of the one more PLBs, wherein:
the write request is received by a client that is executed by the storage processor;
each of the plurality of stripes is associated with a counter that is used to detect when the stripe has become full,
reserving the one or more PLBs includes transmitting from the client to an allocation layer a request to reserve the one or more PLBs and receiving, at the client, a response from the allocation layer indicating that the one or more PLBs have been reserved, and
relinquishing each of the one or more PLBs includes providing, by the client to the allocation layer, an incremented value of the counter for the stripe of which the PLB is part.

4. The method of claim 1, wherein writing the user data and the metadata to different data streams that are opened on the plurality of SSDs includes:
identifying one or more first data streams and writing the user data to the one or more first data streams; and
identifying one or more second data streams, and writing the metadata to the one or more second data streams.

5. The method of claim 1, wherein deleting any given stripe includes deleting the given stripe by issuing, to the SSD, a physical layer unmap command, the unmap command including one of a Small Computer System Interface (SCSI) command, an Advanced Technology Attachment (ATA) TRIM command, or a Non-Volatile Memory Express (NVMe) DEALLOCATE command.

6. A storage processor, comprising:
a memory; and
at least one processor that is operatively coupled to the memory, the at least one processor being configured to perform the operations of:
receiving a write request, the write request including a request to store user data in a storage array that includes a plurality of solid-state drives (SSDs), the storage array and the storage processor being part of a storage system;
reserving, by an allocation layer, one or more physical logical blocks (PLBs), each of the reserved PLBs being part of a respective one of a plurality of stripes; and
executing the write request by: identifying metadata that is associated with the write request, and writing the user data and the metadata to different data streams that are opened on the plurality of SSDs, wherein writing the user data and the metadata to different data streams causes: (i) the user data to be stored in one or more first erase units that are part of any of the plurality of SSDs, and (ii) the metadata to be stored in one or more second erase units that are part of any of the plurality of SSDs, such that no part of the metadata is stored on any of the first erase units, and no part of the user data is stored on any of the second erase units, the first and second erase units being part of a plurality of erase units that are mapped to the reserved PLBs, and
wherein the storage array is a Redundant Array of Independent Disks (RAID) array,
wherein the allocation layer is configured to allocate only PLBs that are part of active stripes, and
wherein a maximum number of stripes that are present in the in the storage system at any given time is determined in accordance with the equation of:

$S_m = (N_{drives} \times N_{stripes})/N\_raid\_drives$ where $S_m$ is the maximum number of stripes, $N_{drives}$ is a count of SSDs in the RAID array, and N_raid_drives is a count of drives in an uber of the RAID array.

7. The storage processor of claim 6, wherein the at least one processor is further configured to perform garbage collection on the storage array, the performing of garbage collection including: identifying any given one of the plurality of stripes that includes PLBs marked for deletion, copying any clean PLBs that are part of the given stripe to a different stripe, and deleting the given stripe.

8. The storage processor of claim 6, wherein:
the at least one processor is further configured to perform the operation of relinquishing each of the one more PLBs,
the write request is received by a client,
each of the plurality of stripes being associated with a counter that is used to detect when the stripe has become full,
reserving the one or more PLBs includes transmitting from the client to an allocation layer a request to reserve the one or PLBs and receiving, at the client, a response from the allocation layer indicating that the one or more PLBs have been reserved, and
relinquishing each of the one or more PLBs includes providing, by the client to the allocation layer, an incremented value of the counter for the stripe of which the PLB is part.

9. The storage processor of claim 6, wherein writing the user data and the metadata to different data streams that are opened on the plurality of SSDs includes:
identifying one or more first data streams and writing the user data to the one or more first data streams; and
identifying one or more second data streams, and writing the metadata to the one or more second data streams.

10. The storage processor of claim 6, wherein deleting any given stripe includes deleting the given stripe by issuing, to the SSD, a physical layer unmap command, the unmap command including one of a Small Computer System Interface (SCSI) command, an Advanced Technology Attachment (ATA) TRIM command, or a Non-Volatile Memory Express (NVMe) DEALLOCATE command.

11. A non-transitory computer-readable medium storing one or more processor-executable instructions, which, when executed by one or more processors of a storage processor, cause the one or more processors to perform the operations of:
receiving a write request, the write request including a request to store user data in a storage array that includes a plurality of solid-state drives (SSD), the storage array the storage processor being part of a storage system;
reserving, by an allocation layer, one or more physical logical blocks (PLBs), each of the reserved PLBs being part of a respective one of a plurality of stripes; and
executing the write request by: identifying metadata that is associated with the write request, and writing the user data and the metadata to different data streams that are opened on the plurality of SSDs, wherein writing the user data and the metadata to different data streams causes: (i) the user data to be stored in one or more first erase units that are part of any of the plurality of SSDs, and (ii) the metadata to be stored in one or more second erase units that are part of any of the plurality of SSDs, such that no part of the metadata is stored on any of the first erase units, and no part of the user data is stored on any of the second erase units, the first and second erase units being part of a plurality of erase units that are mapped to the reserved PLBs, wherein the storage array is a Redundant Array of Independent Disks (RAID) array, wherein the allocation layer is configured to allocate only PLBs that are part of active stripes, and wehrein a maximum number of stripes that are present in the in the storage system at any given time is determined in accordance with the equation of:

$$S_m = (N_{drives} \times N_{stripes})/N\_raid\_drives$$

where $S_m$ is the maximum number of stripes, $N_{drives}$ is a count of SSDs in the RAID array, and Nraid_drives is a count of drives in an uber of the RAID array.

12. The non-transitory computer-readable medium of claim 11, wherein:

the one or more processor-executable instructions, when executed by the one or more processors, further cause the one or more processors to perform the operation of relinquishing each of the one mroe PLBs, the write request is received by a client;

each of the plurality of stripes being associated with a counter that is used to detect when the stripe has become full, reserving the one or more PLBs includes transmitting from the client to an allocation layer a request to reserve the one or more PLBs and receiving, at the client, a response from the allocation layer indicating that the one or more PLBs have been reserved, and relinquishing each of the one or more PLBs includes providing, by the client to the allocation layer, an incremented value of the counter for the stripe of which the PLB is part.

13. The non-transitory computer-readable medium of claim 11, wherein the one or more processor-executable instructions, when executed by the one or more processors, further cause the one or more processors to perform the operation of performing, garbage collection on the storage array, the performing of garbage collection including: identifying any given one of the plurality of stripes that includes PLBs marked for deletion, copying any clean PLBs that are part of the given stripe to a different stripe, and deleting the given stripe.

14. The non-transitory computer-readable medium of claim 11, wherein writing the user data and the metadata to different data streams that are opened on the plurality of SSDs includes:

identifying one or more first data streams and writing the user data to the one or more first data streams; and identifying one or more second data streams, and writing the metadata to the one or more second data streams.

* * * * *